(12) United States Patent
Codrescu et al.

(10) Patent No.: US 9,361,109 B2
(45) Date of Patent: Jun. 7, 2016

(54) SYSTEM AND METHOD TO EVALUATE A DATA VALUE AS AN INSTRUCTION

(75) Inventors: Lucian Codrescu, Austin, TX (US);
Erich James Plondke, Austin, TX (US);
Suresh Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 864 days.

(21) Appl. No.: 12/785,551

(22) Filed: May 24, 2010

(65) Prior Publication Data

US 2011/0289299 A1    Nov. 24, 2011

(51) Int. Cl.
G06F 9/30 (2006.01)
G06F 9/32 (2006.01)
G06F 9/26 (2006.01)

(52) U.S. Cl.
CPC ........ *G06F 9/322* (2013.01); *G06F 9/26* (2013.01); *G06F 9/328* (2013.01)

(58) Field of Classification Search
CPC .......................................... G06F 9/26
USPC ........................................ 712/205
See application file for complete search history.

(56) References Cited

U.S. PATENT DOCUMENTS

| | | | | |
|---|---|---|---|---|
| 4,495,563 A | * | 1/1985 | McDonough | 712/42 |
| 4,821,183 A | * | 4/1989 | Hauris | 712/243 |
| 5,796,974 A | * | 8/1998 | Goddard et al. | 712/211 |
| 6,012,125 A | * | 1/2000 | Tran | 711/125 |
| 6,029,222 A | * | 2/2000 | Kamiya | 710/262 |
| 6,044,220 A | | 3/2000 | Breternitz, Jr. | |
| 7,954,102 B2 | * | 5/2011 | Okawara | 718/102 |
| 2004/0215444 A1 | | 10/2004 | Patel et al. | |
| 2007/0169022 A1 | | 7/2007 | Jones et al. | |

FOREIGN PATENT DOCUMENTS

| | | |
|---|---|---|
| EP | 0123922 A2 | 11/1984 |
| JP | S5247646 A | 4/1977 |
| JP | S54943 A | 1/1979 |
| JP | S59202544 A | 11/1984 |
| JP | S60181837 A | 9/1985 |
| JP | S63226732 A | 9/1988 |
| JP | H0287237 A | 3/1990 |
| JP | H06332692 A | 12/1994 |

(Continued)

OTHER PUBLICATIONS

Patterson, David. Hennessy, John. "Computer Architecture: A Quantitative Approach". Morgan Kaufmann Publishers, Inc. Second Edition, 1996. pp. 40.*

(Continued)

*Primary Examiner* — Corey S Faherty
(74) *Attorney, Agent, or Firm* — Peter Michael Kamarchik; Paul Holdaway

(57) ABSTRACT

A system and method to evaluate a data value as an instruction is disclosed. For example, an apparatus configured to execute program code includes an execute unit configured to execute a first instruction associated with a location of a second instruction. The first instruction is identified by a program counter. The apparatus also includes a decode unit configured to receive the second instruction from the location and to decode the second instruction to generate a decoded second instruction without changing the program counter to point to the second instruction.

48 Claims, 6 Drawing Sheets

(56) References Cited

FOREIGN PATENT DOCUMENTS

| JP | 2000500592 A | 1/2000 |
|---|---|---|
| JP | 2010518470 A | 5/2010 |
| JP | 2011509476 A | 3/2011 |
| TW | 200421174 | 10/2004 |
| WO | 2008092769 A1 | 8/2008 |
| WO | 2009087162 A2 | 7/2009 |

OTHER PUBLICATIONS

Berndl M et al., "Context Threading: A Flexible and Efficient Dispatch Technique for Virtual Machine Interpreters," Third International Symposium on Code Generation and Optimization (CGO '05), San Jose, CA, USA, March 20-23, 2005, Piscataway, NJ, USAJEEE, Mar. 20, 2005, pp. 15-26, XP010781575, ISBN: 978-0-7695-2298-2.

International Search Report and Written Opinion—PCT/US2011/037537—ISA/EPO—Sep. 30, 2011.

"Japanese:z/Architecture Handbook (SA88-8773-00)", IBM Japan, Mar. 2004, First publication, p. 5-21 p. 6-15 p. 6-27 [obtained Oct. 10, 2014], Internet URL: http://www.google.co.jp/url?sa=t&rct=j&q=&esrc=s&source=web&cd=1&cad=rja&uact=8&ved=0CCcQFjAA&url=http%3A%2F%2Fwww.ibm.com%2Fsupport%2Fdocview.wss%3Fuid%3Dpub3sa88877300&ei=aGB1U4iuCs6dugSUIIGIBQ&usg=AFQjCNHy0vC8vz9tXlmckkfzN6KjKTXaFA&bvm=bv.66917.

"Japanese:z/Architecture Handbook (SA88-8773-00)", IBM Japan, Mar. 2004, First publication, p. A-21 [obtained May 15, 2014], Internet URL: http://www.google.co.jp/url?sa=t&rct=j&q=&esrc=s&source=web&cd=1&cad=rja&uact=8&ved=OCCcQFjAA&url=http%3A%2F%2Fwww.ibm.com%2Fsupport%2Fdocview.wss%3Fuid%3Dpub3sa88877300&ei=aGB1U4iuCs6dugSUIIGIGIBQ&usg=AFQjCNHy0vz9tX1mckkfzN6KjKTXaFA&bvm=bv.66917.

\* cited by examiner

SYSTEM AND METHOD TO EVALUATE A DATA VALUE AS AN INSTRUCTION

I. FIELD

The present disclosure is generally related to data processing systems, and more particularly, to evaluating data values and instructions within data processing systems.

II. DESCRIPTION OF RELATED ART

Interpreted programming languages are designed to create applications with source code that may be executed on multiple hardware platforms. Java™ is an interpreted programming language that accomplishes platform independence by generating source code that is converted before runtime to an intermediate language known as byte code or virtual machine instructions. These instructions cannot typically be executed directly by the central processing unit (CPU). The byte code is executed at runtime by platform-appropriate machine code known as interpreter software. To interpret each byte code instruction, interpreter software may perform a fetch, decode, and execute series of operations, or instructions.

For each byte code instruction defined by the virtual machine, the interpreter software typically includes a corresponding execution program expressed in central processing unit (CPU) instructions. The interpreter software may cause the CPU to fetch, or read, a virtual machine instruction from a memory. The interpreter software may further cause the CPU to decode the address of the execution program for the byte code instruction. Control of the CPU may be transferred to the execution program, which executes the sequence of instructions that carry out the operations that implement the byte code.

Executing the sequence of native machine instructions for each byte code can be inefficient. Other methods for executing bytecode include compiling the byte codes into native machine codes that may be executed directly. However, such "Just In Time" compilations can be costly and complex to implement. Therefore, more efficient interpreters are desirable.

III. SUMMARY

In a particular embodiment, an evaluation instruction is introduced into an interpreter loop. The evaluation instruction may cause a processor to read a register, and the contents of the register may be executed as the next instruction. For example, a data value read from a register as a result of the evaluation instruction may become a next occurring instruction. Execution of the contents of the register as the next instruction may simplify and improve efficiency of interpreter loop operation.

In another particular embodiment, a method of executing program code is disclosed. The method includes receiving a first instruction that comprises an operand to identify a location of a second instruction. The first instruction is identified by a program counter. Upon executing the first instruction, the second instruction may be retrieved from the location. The method includes providing the retrieved second instruction to a decode unit without changing the program counter to point to the second instruction. The method also includes decoding the second instruction using the decode unit and executing the second instruction.

In another particular embodiment, another method of executing program code is disclosed. The method includes receiving a first instruction associated with a location of a second instruction. The first instruction is identified by a program counter. The first instruction is executed to identify the location. Upon execution, the second instruction is retrieved from the location without changing the program counter to point to the second instruction. The method further includes executing the second instruction at the processor.

In another particular embodiment, an apparatus configured to execute program code is disclosed. The apparatus includes an execute unit configured to execute a first instruction associated with a location of a second instruction. The first instruction is identified by a program counter. The apparatus also includes a decode unit configured to receive the second instruction from the location and to decode the second instruction to generate a decoded second instruction without changing the program counter to point to the second instruction.

In another particular embodiment, a computer-readable medium storing instructions executable by a computing system is disclosed. The instructions include instructions to receive a first instruction associated with a location of a second instruction. The first instruction is identified by a program counter. The instructions also include instructions to execute the first instruction to identify the location, and upon execution of the first instruction, to retrieve the second instruction from the location without changing the program counter to point to the second instruction. The instructions further include instructions to execute the second instruction.

One particular advantage provided by at least one of the disclosed embodiments is increased interpreter operation speed and efficiency. The disclosed instructions may be implemented in existing systems with relatively low overhead. Interpreter loop operations may be simplified. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
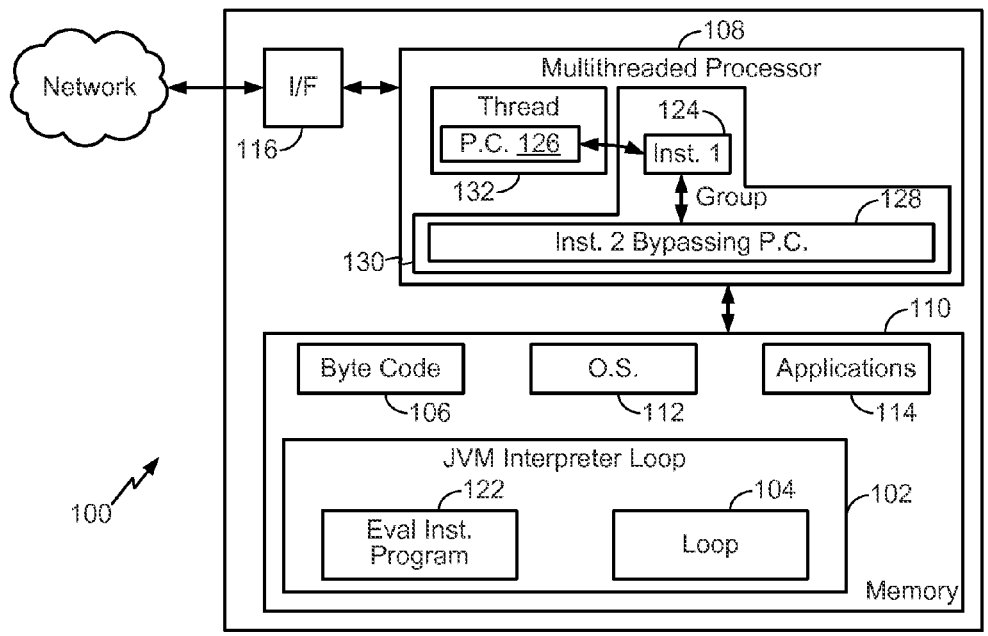
FIG. 1 is a block diagram of a particular illustrative embodiment of an apparatus that includes an interpreter configured to evaluate a data value as an instruction.

Referring to FIG. 1, a particular illustrative embodiment of an apparatus configured to evaluate a data value as an instruction is disclosed and generally designated 100. The apparatus 100 may include a multithreaded processor 108 coupled to a memory 110 and a network interface 116. The memory 110 includes a Java™ Virtual Machine (JVM) interpreter loop 102. The JVM interpreter loop 102 includes a program loop 104 and an evaluation instruction program 122. The memory 110 further includes byte code 106. The byte code 106 generally includes a binary file including program instructions suitable for execution by the JVM interpreter loop 102. The memory 110 further includes an operating system 112 and one or more applications 114.

The multithreaded processor 108 includes a thread 132. The thread 132 may include a program counter 126 that points to a group of instructions 130. A first instruction 124 and a second instruction 128 may be included within the group of instructions 130. Thus, a common thread 132 may execute both the first instruction 124 and the second instruction 128. In one embodiment, the group of instructions 130 may be non-interruptible. According to another particular embodiment, the first instruction 124 may be undone when an interrupt is received before the second instruction 128 is executed.

The first instruction 124 may include an operand to identify a location of the second instruction 128. The first instruction 124 may be identified by the program counter 126. The first instruction 124 may include an evaluation instruction that causes the multithreaded processor 108 to evaluate a data value of the first instruction 124 as an instruction. The second instruction 128 may bypass the program counter 126.

FIG. 1 shows a particular illustrative apparatus 100 that includes a JVM interpreter loop 102 that may evaluate a data value as an instruction. The operation of the interpreter loop 102 may generate translated results with reduced processing and greater efficiency.

Figure 2:
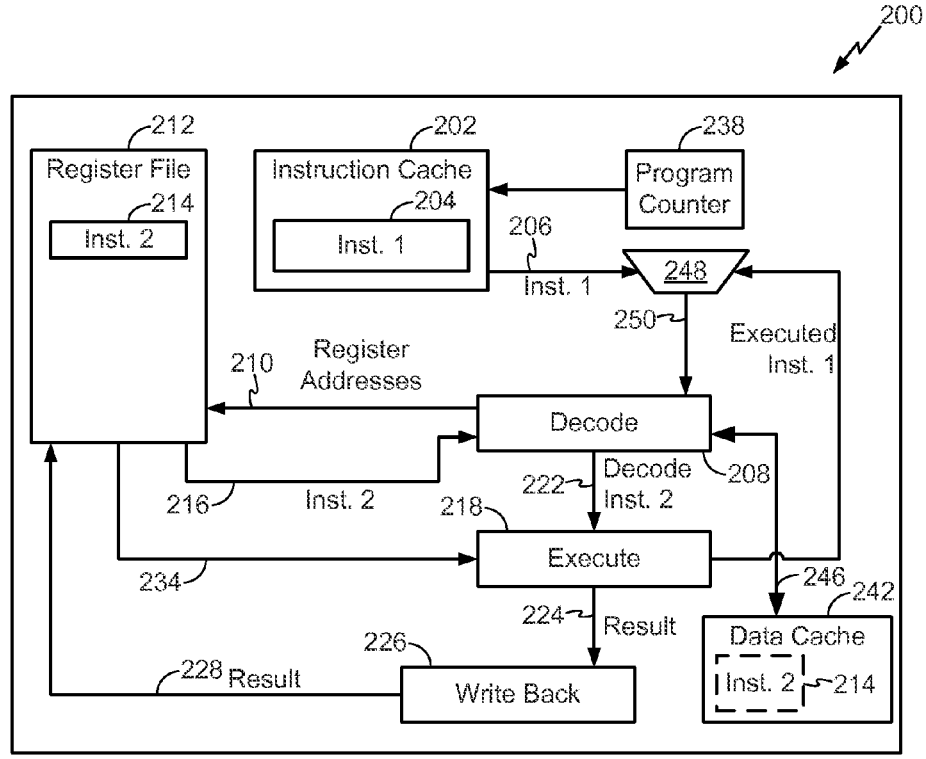
FIG. 2 is a block diagram of a particular illustrative embodiment of a system capable of executing an interpreter, such as the interpreter of FIG. 1, which includes a decode unit configured to decode an instruction received from an execute unit.

Referring to FIG. 2, a block diagram of a particular illustrative embodiment of a system capable of executing an interpreter is disclosed and generally designated 200. In one embodiment, the interpreter may be similar to the JVM interpreter loop 102 of FIG. 1. The system 200 includes an instruction cache 202 having a first instruction 204. The first instruction 204 of FIG. 2 may be the same as the first instruction 124 of FIG. 1. The first instruction 204 may include a byte code to be translated into platform appropriate machine code.

The instruction cache 202 may be coupled via a path 206 to a multiplexer 248, which is coupled to a decode unit 208 via a path 250. The decode unit 208 may be configured to decode instructions, such as the first instruction 204 received from the instruction cache 202. The decode unit 208 may be coupled to an execute unit 218 via a path 222. The decode unit 208 may further provide register addresses to a register file 212 via a path 210.

The execute unit 218 may be configured to execute instructions received from the decode unit 208 via a path 222, as well as instructions received from the register file 212 via a bus 234. For example, the execute unit 218 may be configured to execute a second instruction 214 stored within the register file 212. In a particular embodiment, the second instruction 214 is an instruction within an interpreter loop. For example, the second instruction 214 may include an instruction executable by and within the JVM interpreter loop 102 of FIG. 1. The second instruction 214 of FIG. 2 may be the same as the second instruction 128 of FIG. 1. The first instruction 204 may be identified by a program counter 238. The executed first instruction 204 may be output from the execute unit 218 to a write back unit 226 via a path 224. The write back unit 226 may forward the result of the executed first instruction 204 via a bus 228 to the register file 212.

The decode unit 208 may be configured to receive the second instruction 214 from the register file 212. In an alternative embodiment, the decode unit 208 may receive an alternative copy of the second instruction 214 from a data cache 242 via a path 246. In a particular embodiment, the second instruction 214 may be derived from an interpretive instruction. For example, the second instruction 214 may include an instruction executable by the JVM interpreter loop 102 of FIG. 1. The decode unit 208 may further decode the second instruction 214 to generate a decoded second instruction without changing the program counter 238 to point to the second instruction 214. According to a particular embodiment, the program counter 238 may be unable to point to the second instruction 214. For instance, where the program counter 238 includes a memory address, the program counter 238 may be incapable of pointing to a register file location.

In operation, the first instruction 204 may be communicated from the instruction cache 202 to the decode unit 208. The first instruction 204 may be identified by a program counter 238. The decode unit 208 may decode and transmit the first instruction 204 to the execute unit 218 via the path 222. The decoded first instruction 204 may be executed to produce a result that is communicated via the bus 224 to the write back unit 226. The result may be communicated via the bus 228 to the register file 212. The result may be used to select the second instruction 214. For example, the first instruction 204 may be executed to generate a location of the second instruction 214.

As a result of the execution of the first instruction 204, the second instruction 214 may be retrieved via a bus 216 at the decode unit 208. Alternatively, the second instruction 214 may be retrieved from the data cache 242. For example, the first instruction 204 can specify a source location of the second instruction 214 as being a location in memory that may be in the data cache 242 or as being a register that contains the second instruction 214. The second instruction 214 may have been previously loaded to the register from memory or may have been stored at the register as a result of a prior computation. Execution of the first instruction 204 may configure the system 200 to retrieve the second instruction 214 from the specified location and to execute the second instruction 214.

The second instruction 214 may be delivered to the decode unit 208 without changing the program counter 238 to point to the second instruction 214. The decode unit 208 may decode the second instruction 214. The decoded second instruction may be communicated from the decode unit 208 via the path 222 to the execute unit 218. A result may be output from the execute unit 218 to the write back unit 226. The write back unit 226 may communicate the result via the bus 228 to the register file 212.

FIG. 2 therefore shows an interpreter 200 that executes a first instruction 204 to identify location information used to locate a second instruction 214. The decode unit 208 receives the second instruction 214 from the register file 212 or the data cache 242, instead of from the instruction cache 202, which may lead to faster translation.

Figure 3:
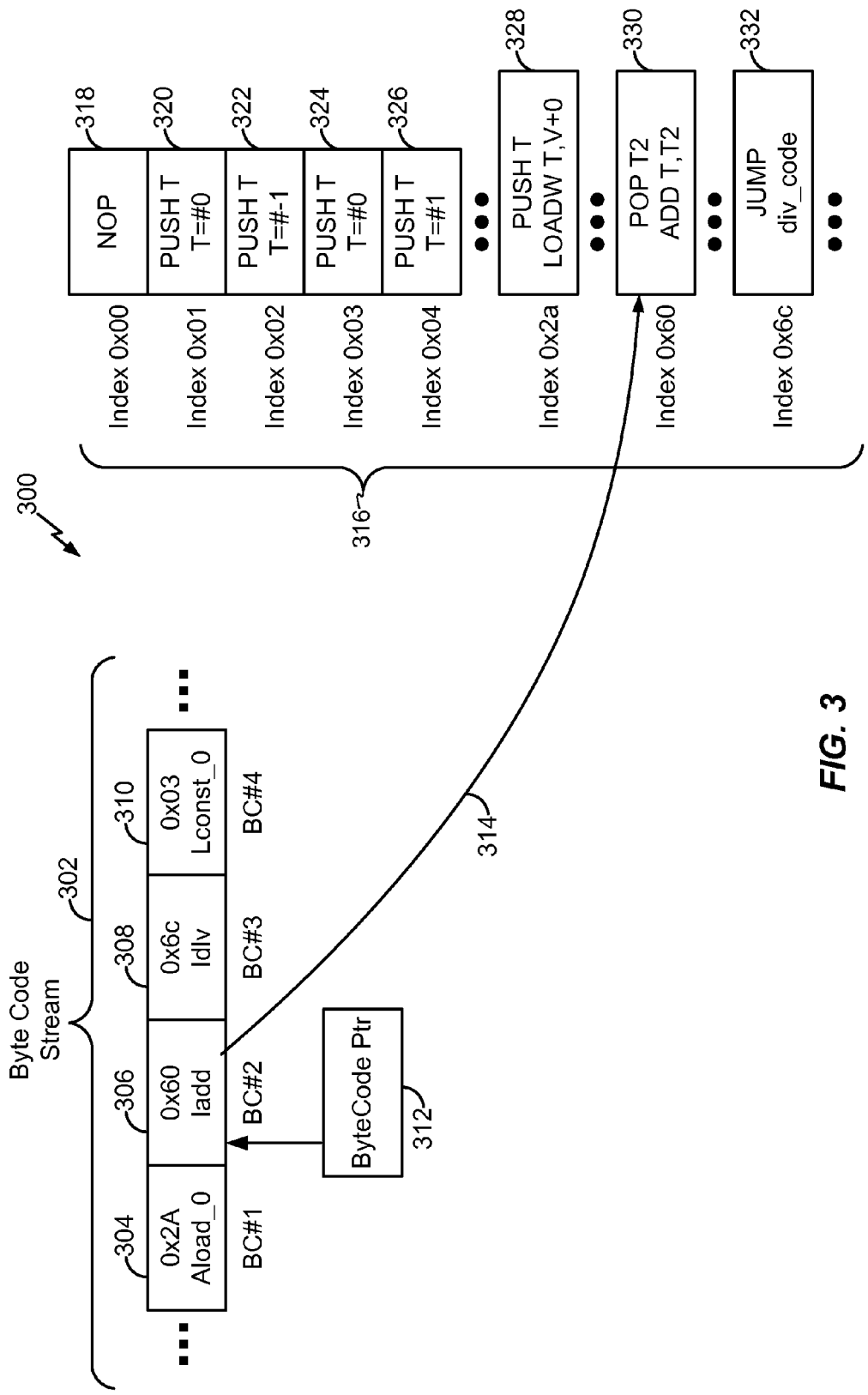
FIG. 3 is a block diagram of a particular illustrative embodiment of system that interprets and executes byte code.

Referring to FIG. 3, a block diagram of a particular illustrative embodiment of a system configured to interpret and execute byte code is disclosed and generally designated 300. The system 300 includes a byte code stream 302 that is translated into instructions of a lookup table 316.

The byte code stream 302 includes a first byte code instruction 304, a second byte code instruction 306, a third byte code instruction 308, and a fourth byte code instruction 310. For each byte code instruction, the encoding and mnemonic are shown. For example, the fourth byte code instruction 310 is encoded as 0x03 and has a mnemonic of Lconst_0. A pointer 312, ByteCodePtr, designates a byte code instruction to be executed. For example, the pointer 312 in FIG. 3 points to and initiates loading of the second byte code instruction 306. The second byte code instruction 306 encoding (i.e. 0x60) can be used to perform a lookup operation 314 at the lookup table 316.

The lookup table 316 includes entries 318, 320, 322, 324, 326, 328, 330, and 332 that correspond to the byte codes encoded as 0x00, 0x01, 0x02, 0x03, 0x04, 0x2a, 0x60, and 0x6c, respectively. The lookup table 316 may be stored within a memory, such as the memory 110 of FIG. 1. The lookup table 316 can contain entries for all possible byte codes, however only certain byte codes are shown for clarity of explanation. The entries 318-332 include native machine instructions. The entries 318-332 of the lookup table 316 may include a single native machine operation, such as the entry 318 (i.e., no operation, or "NOP"). Alternatively, entries of the lookup table 316 may include multiple instructions, such as a packet of native machine operations included in the entry 324 (i.e., "PUSH T" and "T=0") that corresponds to the byte code instruction 310. In another example, the byte code instruction 306 may correspond to the entry 330, which includes both "POP T2" and "ADD T, T2" instructions. Still other entries, such as the "JUMP div_code" instruction of the entry 332, may cause an interpreter to branch to a location that implements a complex instruction.

In a particular embodiment, multiple native machine operations associated with a single bytecode instruction may be processed as a non-interruptible group or packet of instructions. For example, the byte code instruction 310 may include a Java™ instruction that corresponds to multiple native machine operations in the entry 324. Processing of the multiple native machine operations in the entry 324 may be controlled to ensure that an interruption does not occur in the middle of processing the Java™ instruction.

FIG. 3 thus shows a logical diagram of a byte code translation process. A byte code instruction 306 is interpreted using a lookup table 316. The lookup table 316 may include multiple types of instructions, rather than only jump instructions. The byte code instruction 306 may be logically associated with an entry 330 of the lookup table 316. The translation process may enable relatively less encoding with fewer jumps and associated branching. That is, simpler interpreter loop instructions may be enabled because the instructions in the lookup table 316 may be executed instead of using branching operations to locate an instruction. Further, multiple instructions may be included within a single entry of the lookup table 316. For example, the entry 330 includes a packet of multiple native machine operations, or instructions, such as arithmetic instructions. The lookup table 316 may be dynamically updated with instructions without using additional hardware and associated overhead costs.

Figure 4:
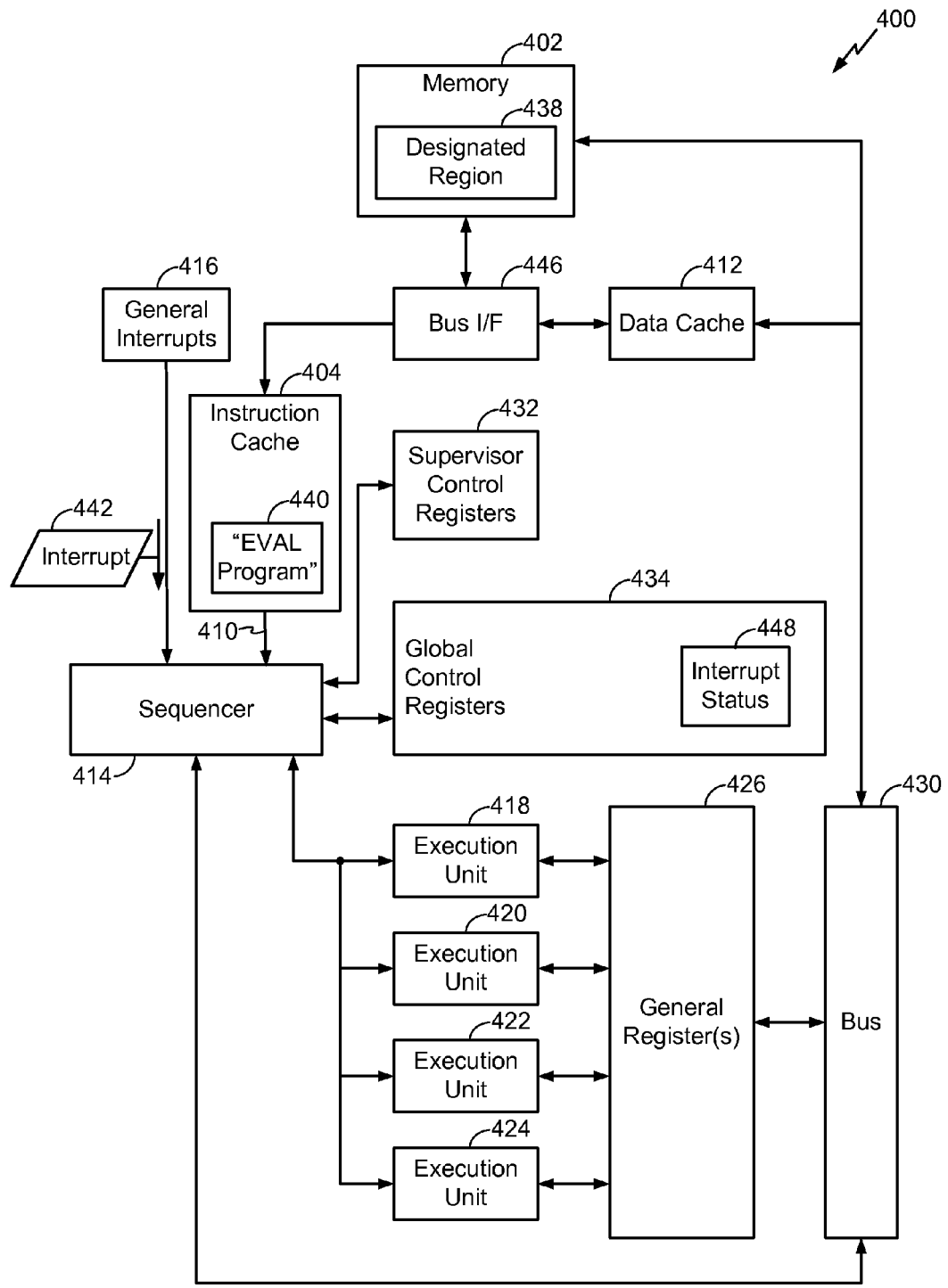
FIG. 4 is a block diagram of a particular illustrative embodiment of a system including an interleaved multi-threaded processor configured to execute an evaluation instruction to cause the multi-threaded processor to evaluate a data value as an instruction.

FIG. 4 is a block diagram of a particular illustrative embodiment of a processing system 400 that includes an interleaved multi-threaded processor configured to execute evaluation program code to cause the multi-threaded processor to evaluate a data value as an instruction. The processing system 400 includes a memory 402 that is adapted to communicate via a bus interface 446 with an instruction cache 404 and a data cache 412. The instruction cache 404 is coupled to a sequencer 414 by a bus 410. The instruction cache 404 includes an evaluation program 440 that may be executed by one or more execution units 418, 420, 422, and 424 to evaluate a data value as an instruction.

The sequencer 414 is adapted to receive interrupts, such as general interrupts 416, which may be received from an interrupt register. The sequencer 414 is also coupled to supervisor control registers 432 and to global control registers 434. The sequencer 414 is coupled to multiple execution units, such as a first instruction execution unit 418, a second instruction execution unit 420, a third instruction execution unit 422, and a fourth instruction execution unit 424, that may be used to execute multiple instructions in parallel. Each instruction execution unit 418, 420, 422, and 424 can be coupled to a general register file 426. The general register file 426 can also be coupled to the sequencer 414, the data cache 412, and the memory 402 via a bus 430.

The supervisor control registers 432 and the global control registers 434 may store bits that may be accessed by control logic within the sequencer 414 to determine whether to accept interrupts and to control execution of instructions. According to a particular embodiment, a first instruction, such as the first instruction 124 of FIG. 1, may be undone when an interrupt 442 is received before the second instruction, such as the second instruction 128 of FIG. 1, is executed. The interrupt 442 may be indicated by an interrupt status 448, as shown in FIG. 4. According to another particular embodiment, a first instruction and a second instruction, such as the first instruction 124 and the second instruction 128 of FIG. 1, may be non-interruptible.

Because a program counter is not changed when the second instruction 128 is executed, a state of the processor that is recorded to handle an interrupt between the first instruction 124 and the second instruction 128 may not accurately reflect that the second instruction 128 is to be executed. The processing system 400 may control execution of the first instruction 124 and the second instruction 128 to be non-interruptible, or to ensure that if an interrupt is received after the first instruction 126 but before the second instruction 128, the first instruction 126 may be undone and may be re-executed after the interrupt.

The processing system 400 may also control execution of instructions that may include multiple native machine operations, such as the byte code instruction 310 of FIG. 3 (e.g., a Java™ instruction) that corresponds to multiple native machine instructions of the entry 324, to ensure processing of the multiple native machine operations without interruption. The first instruction and the second instruction may thus be included within a non-interruptible group of instructions. One or more instructions may be retrieved from a location, such as a designated region 438 of the memory 402. For example, the second instruction 214 of FIG. 2 may be retrieved from a designated region of memory upon execution of the first instruction 204.

The instruction cache 404 may be coupled to the sequencer 414 via a plurality of instruction registers. In a particular embodiment, the processing system 400 is an interleaved multi-threaded processor including multiple threads. The processing system 400 sequentially executes instructions from each of the different threads. Interleaving processing of the software threads enables a processor to be clocked at an aggressive clock cycle to efficiently utilize the processing capabilities of a hardware thread. For example, while a relatively slow data read or write operation is being processed for one software thread, an instruction from another software thread may be executed, or at least partially executed, by the processor without waiting for completion of the data read or write operation.

The processing system 400 of FIG. 4 includes an interleaved multi-threaded processor configured to execute evaluation program code. In the embodiment of FIG. 1, the processing system 400 of FIG. 4 may be used as the multithreaded processor 108. The use of multiple threads may allow efficient processor utilization in a case of a cache miss and may facilitate efficient reading of data values as instructions, speeding byte code interpretation.

Figure 5:
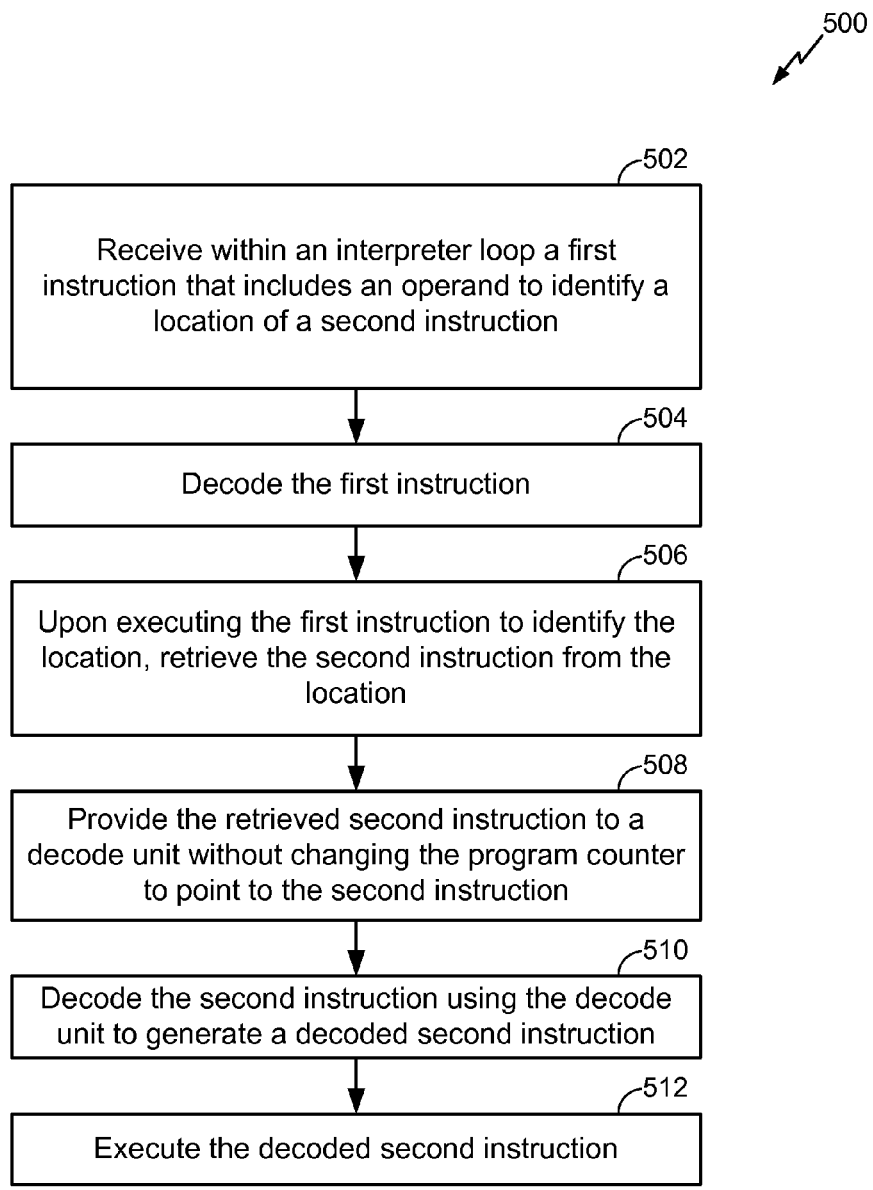
FIG. 5 is a flow chart of a first illustrative embodiment of a method of processing instructions.

FIG. 5 is a flow chart of a particular illustrative embodiment of a method 500 of processing instructions. For example, the illustrative method 500 may be performed by the apparatus 100 of FIG. 1 or the system 200 of FIG. 2.

A first instruction that includes an operand to identify a location of a second instruction may be received within an interpreter loop, at 502. The first instruction is identified by a program counter. For example, a first instruction 204 of FIG. 2 may be received within a system 200 capable of executing an interpreter and that includes an operand to identify a location of a second instruction 214. The first instruction 204 is identified by the program counter 238.

The first instruction may be decoded, at 504. The first instruction may be an evaluation instruction. For instance, a first instruction 204 of FIG. 2 may be decoded by a decode unit 208. The first instruction 204 may be an evaluation instruction.

Upon executing the first instruction to identify the location, the second instruction may be retrieved from the location, at 506. The location may include a register, a cache, or a designated region of memory. For example, a first instruction 204 of FIG. 2 may be executed to generate the location of a second instruction 214. The second instruction 214 may be retrieved from the generated location, such as from a register within the register file 212 of FIG. 2, from the data cache 242 of FIG. 2, from a designated region of a memory, such as the designated region 438 of FIG. 4, or from another location.

The second instruction 214 may be retrieved from the location upon execution of the first instruction 204 at the execute unit 218 of FIG. 2. The second instruction may include a single native machine operation or a packet of multiple native machine operations. For example, entry 318 of FIG. 3 includes a single native machine operation. Alternatively, entry 324 of FIG. 3 includes a packet of native machine operations.

The retrieved second instruction may be provided to a decode unit without changing the program counter to point to the second instruction, at 508. For instance, the second instruction 214 of FIG. 2 may be provided via a bus 216 to a decode unit 208 without changing the program counter 238 to point to the second instruction 214. The program counter 238 may not be incremented to hold the address of the second instruction 214, which may reduce processing requirements.

The second instruction may be decoded using the decode unit to generate a decoded second instruction, at 510. For example, the second instruction 214 of FIG. 2 may be decoded using a decode unit 208 to generate a decoded second instruction that is output via a path 222. In an embodiment where the second instruction includes a group of native machine operations, each of the group of native machine operations may be decoded, such as at the decode unit 208.

The second instruction may be executed without changing the program counter to point to the second instruction, at 512. For instance, a decoded second instruction sent to an execute unit 218 via the path 222 may be executed by the execute unit 218 of FIG. 2. The execute unit 218 may execute a single instruction where the second instruction includes a single native machine operation. Alternatively, the execute unit 218 may execute multiple instructions where the second instruction includes multiple native machine operations. For example, in executing the second instruction, the execute unit 218 may execute both a push operation and an arithmetic operation. In a particular embodiment, multiple native machine operations corresponding to a single byte code instruction may be executed as a single very long instruction word (VLIW) packet, with multiple or all instructions of the VLIW packet being executed in parallel, such as at the execution units 418-424 of FIG. 4. The program counter may be changed after executing the second instruction.

FIG. 5 illustrates a process for executing program code in a manner that enables a data value to be evaluated as an instruction. For example, a next instruction may be received from an execute unit, rather than from an instruction cache. Efficiencies realized by the method 500 of FIG. 5 may increase interpreter translation speed.

Figure 6:
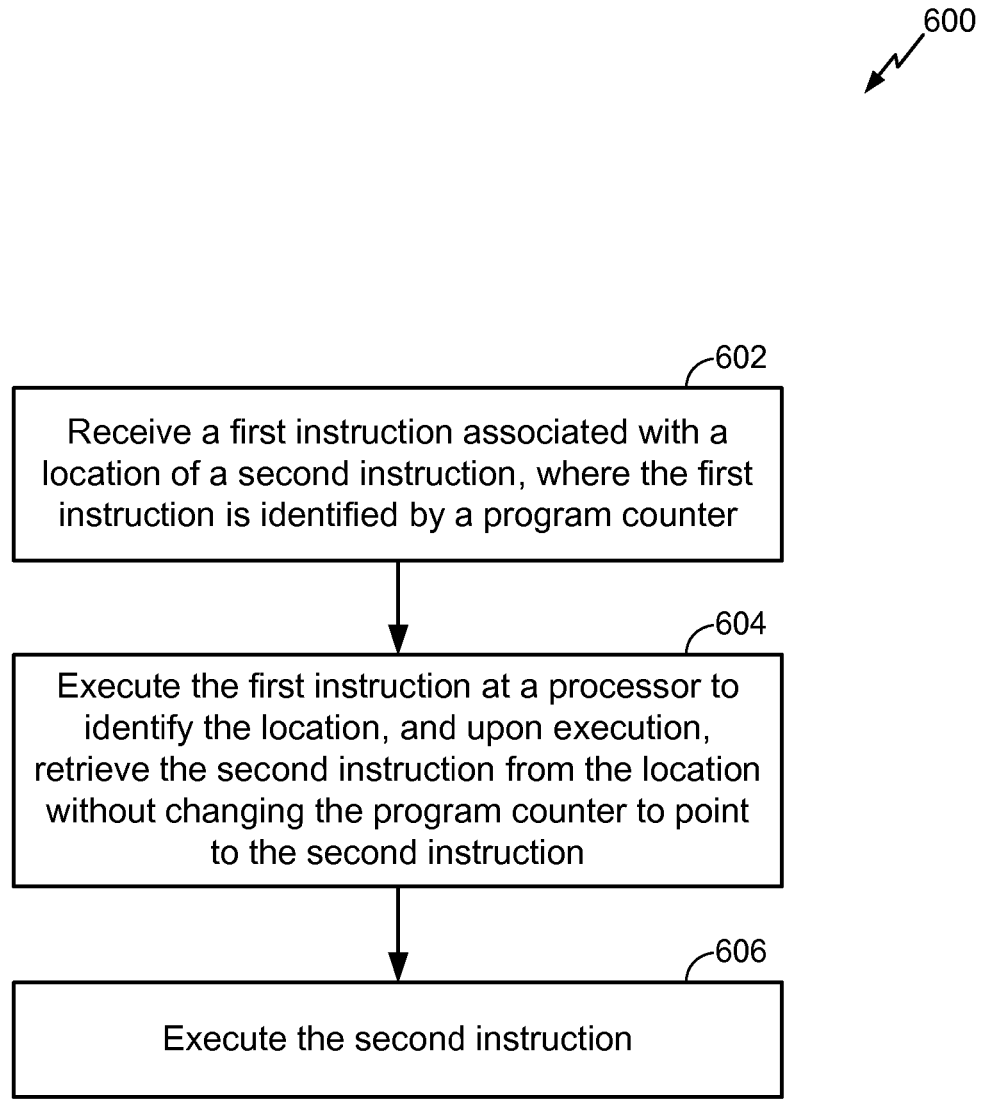
FIG. 6 is a flow chart of a second illustrative embodiment of a method of processing instructions.

FIG. 6 is a flow chart of a particular illustrative embodiment of a method 600 of processing instructions. As described herein, the illustrative method 600 may be performed by the apparatus 100 of FIG. 1 or the system 200 of FIG. 2.

A first instruction may be received that is associated with a location of a second instruction, where the first instruction is identified by a program counter, at 602. For example, a first instruction 204 of FIG. 2 may be received that implies a location of a second instruction 214. The first instruction 204 may be identified by a program counter 238.

The first instruction may be executed at a processor to identify the location of the second instruction, and upon execution, the second instruction may be retrieved from the location without changing the program counter to point to the second instruction, at 604. For example, the second instruction 214 of FIG. 2 may be retrieved upon execution of the first instruction 204 at a multithreaded processor. The second instruction 214 of FIG. 2 may be retrieved without changing the program counter 238 to point to the second instruction 214.

The second instruction may be executed, at 606. For instance, a second instruction 214 sent to an execute unit 218 via a path 222 may be executed by the execute unit 218 of FIG. 2. The execute unit 218 may execute a single instruction where the second instruction 214 includes a single native machine operation. Alternatively, the execute unit 218 may execute multiple native machine operations where the second instruction 214 includes multiple native machine operations. For example, in executing the second instruction 214, the execute unit 218 may execute both a push operation and an arithmetic operation.

Figure 7:
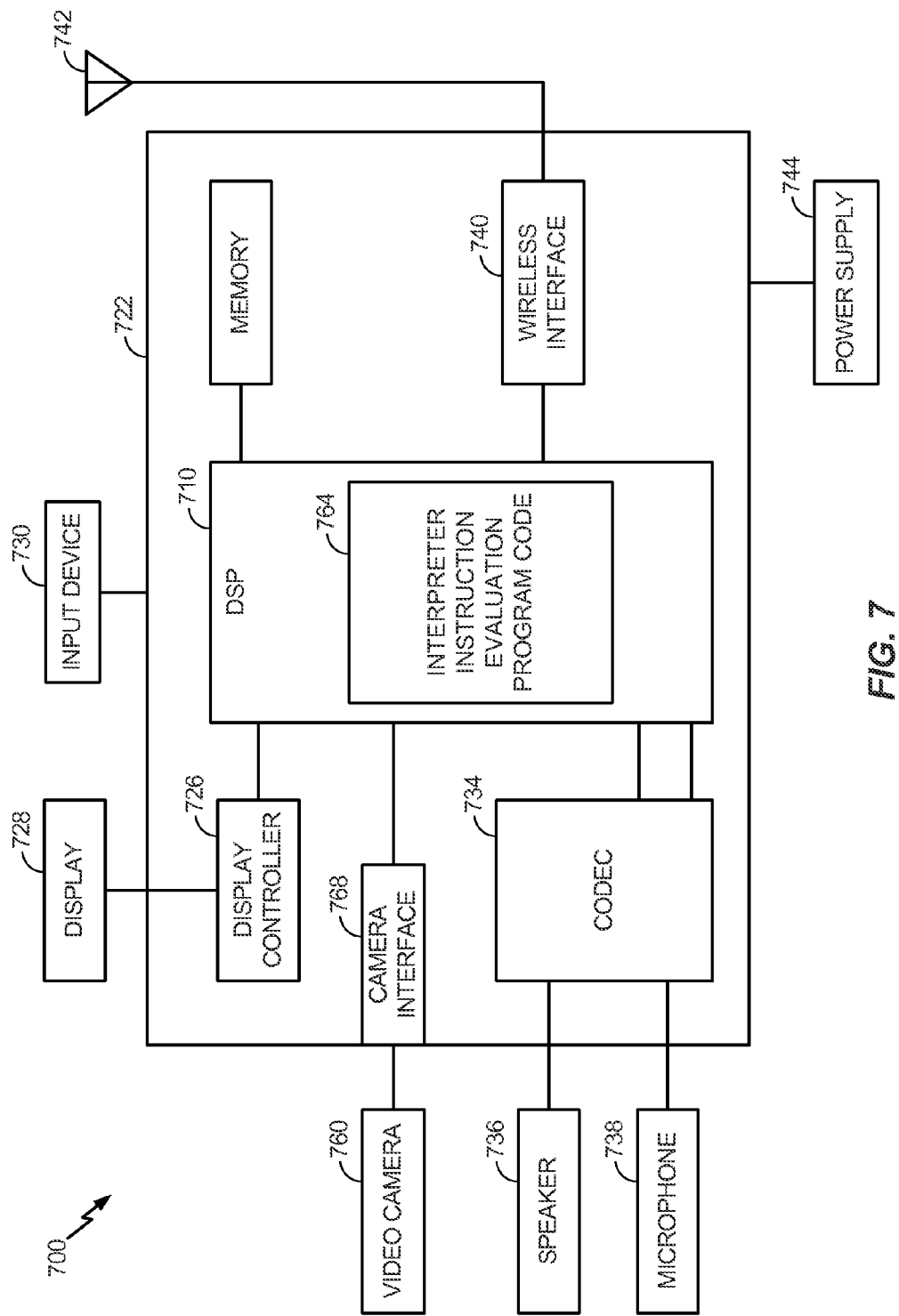
FIG. 7 is a block diagram of an electronic device that includes program code configured to be executed by a digital signal processor to evaluate a data value as an instruction.

FIG. 7 is a block diagram of a particular illustrative embodiment of a communications device 700 that includes a digital signal processor (DSP) 710 that includes an interpreter instruction evaluation program code 764 to translate one or more byte codes, as described in FIGS. 1-6. FIG. 7 also shows a display controller 726 that is coupled to the digital signal processor 710 and to a display 728. Moreover, an input device 730 is coupled to the DSP 710. A coder/decoder (CODEC) 734 can also be coupled to the DSP 710. A speaker 736 and a microphone 738 can be coupled to the CODEC 734. A video camera 760 configured to capture still pictures, motion video, or both, may be coupled via a camera interface 768 to the DSP 710. The DSP 710 with its interpreter instruction evaluation program code 764 may process byte codes as previously described.

FIG. 7 also indicates that a wireless interface 740 can be coupled to the DSP 710 and to a wireless antenna 742. In a particular embodiment, a power supply 744 is coupled to the on-chip system 722. Moreover, in a particular embodiment, as illustrated in FIG. 7, the display 728, the input device 730, the speaker 736, the microphone 738, the wireless antenna 742, and the power supply 744 are external to the on-chip system 722. However, each is coupled to a component of the on-chip system 722.

It should be understood that while the interpreter instruction evaluation program code 764 may be depicted as a component of or executed by the DSP 710, the interpreter instruction evaluation program code 764 may be otherwise integrated into other components of the DSP 710, manifested as separate components from the DSP 710, or otherwise.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The processes of a method or algorithm described in connection with the embodiments disclosed herein may be embodied directly in hardware, in a software module executed by a processor, or in a combination of the two. For example, a device suited to execute embodiments may be selected from a set top box, a music player, a video player, an entertainment unit, a navigation device, a communications device, a personal digital assistant (PDA), a fixed location data unit, and a computer, into which the execute unit and the decode unit are integrated.

A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein, but is to be accorded the widest scope possible consistent with the principles and novel features as defined by the following claims.

What is claimed is:

1. A method of executing program code, the method comprising:
   receiving a first instruction that includes an operand to identify a writable location of a second instruction, wherein the first instruction is identified by a program counter;
   upon executing the first instruction at a first execution unit to identify the writable location, retrieving the second instruction from the writable location;
   providing the retrieved second instruction to a decode unit without changing the program counter to point to the second instruction;
   decoding the second instruction using the decode unit; and
   executing at least a portion of the second instruction at a second execution unit, wherein the first execution unit and the second execution unit are the same execution unit.

2. The method of claim 1, further comprising changing the program counter after executing the second instruction.

3. The method of claim 1, wherein the first instruction and the second instruction comprise a group of instructions that are non-interruptible.

4. The method of claim 1, wherein the second instruction comprises a packet of multiple native machine instructions.

5. The method of claim 1, wherein the second instruction is a single instruction.

6. The method of claim 1, wherein the second instruction is at least one of a jump instruction and an arithmetic instruction.

7. The method of claim 1, wherein the first instruction is an instruction within an interpreter loop, and wherein the second instruction is derived from the interpreter loop interpreting the first instruction.

8. The method of claim 1, wherein the first instruction is an evaluation instruction that evaluates data values as instructions.

9. A method of executing program code, the method comprising:
   receiving a first instruction that includes an operand to identify a writable location of a second instruction, wherein the first instruction is identified by a program counter;
   executing the first instruction at a first execution unit of a processor to identify the writable location, and upon execution, retrieving the second instruction from the writable location without changing the program counter to point to the second instruction; and
   executing at least a portion of the second instruction at a second execution unit, wherein the first execution unit and the second execution unit are the same execution unit.

10. The method of claim 9, further comprising writing results of the executed second instruction to a memory.

11. The method of claim 9, wherein the second instruction is at least one of a jump instruction and an arithmetic instruction.

12. The method of claim 9, wherein the writable location is at a register file.

13. The method of claim 9, wherein the writable location is a designated region of a memory.

14. The method of claim 9, further comprising decoding the first instruction prior to executing the first instruction.

15. An apparatus to execute program code, the apparatus comprising:
   a first execution unit configured to execute a first instruction that includes an operand to identify a writable location of a second instruction, wherein the first instruction is identified by a program counter; and
   a decode unit configured to receive the second instruction from the writable location and to decode the second instruction to generate a decoded second instruction without changing the program counter to point to the second instruction, wherein a second execution unit is configured to execute at least a portion of the decoded second instruction, and wherein the first execution unit and the second execution unit are the same execution unit.

16. The apparatus of claim 15, wherein the first execution unit is further configured to initiate the second execution unit retrieving the second instruction from the writable location.

17. The apparatus of claim 15, wherein the writable location is at a data cache.

18. The apparatus of claim 15, wherein the program counter is unable to point to the second instruction.

19. The apparatus of claim 15, wherein the second instruction is at least one of a jump instruction and an arithmetic instruction.

20. The apparatus of claim 15, wherein the program counter is changed after executing the second instruction.

21. The apparatus of claim 15, wherein the second instruction comprises a packet indicating multiple native machine operations.

22. The apparatus of claim 15, wherein the second instruction is a single instruction.

23. The apparatus of claim 15, further comprising a register configured to receive results of the executed second instruction.

24. The apparatus of claim 15, wherein the first instruction is an evaluation instruction.

25. The apparatus of claim 15, wherein the first instruction and the second instruction comprise a group of instructions that are non-interruptible.

26. The apparatus of claim 15, wherein the first instruction and the second instruction are executed by a common thread.

27. The apparatus of claim 15, wherein the first instruction is undone when an interrupt is received before the second instruction is executed.

28. The apparatus of claim 15, wherein the decoded second instruction is executed by the second execution unit.

29. The apparatus of claim 15, further comprising a device selected from the group consisting of a set top box, a music player, a video player, an entertainment unit, a navigation device, a communications device, a personal digital assistant (PDA), a fixed location data unit, and a computer, into which the first execution unit and the decode unit are integrated.

30. A non-transitory computer-readable medium storing instructions executable by a computing system to cause the computing system to:
receive a first instruction that includes an operand to identify a writable location of a second instruction, wherein the first instruction is identified by a program counter;
execute the first instruction at a first execution unit to identify the writable location, and upon execution, retrieve the second instruction from the writable location without changing the program counter to point to the second instruction; and
execute at least a portion of the second instruction at a second execution unit, wherein the first execution unit and the second execution unit are the same execution unit.

31. The non-transitory computer-readable medium of claim 30, wherein the instructions are further executable by the computing system to write results of the executed second instruction to a register.

32. The non-transitory computer-readable medium of claim 30, wherein the second instruction is at least one of a jump instruction and an arithmetic instruction.

33. The non-transitory computer-readable medium of claim 30, wherein the writable location is at least one of a register and a designated region of a memory.

34. The method of claim 1, wherein the writable location is at a lookup table, the lookup table storing native instructions corresponding to byte codes.

35. The method of claim 1, further comprising, in response to receiving an interrupt before the second instruction is executed, executing an interrupt routine prior to execution of the second instruction.

36. The method of claim 1, wherein the second instruction is a non-interruptible instruction.

37. The method of claim 1, wherein the first instruction includes a byte code corresponding to a first instruction set.

38. The method of claim 37, wherein the first instruction set is a Java instruction set.

39. The method of claim 37, wherein the second instruction corresponds to a second instruction set.

40. The method of claim 39, wherein the second instruction set comprises native machine instructions.

41. The method of claim 1, further comprising writing data to the writable location.

42. The method of claim 1, wherein the writable location is accessed during execution of the program code.

43. The method of claim 1, wherein the first instruction is an architectural instruction.

44. The method of claim 1, wherein the writable location is rewritable during execution of the program code.

45. The method of claim 1, wherein the second instruction comprises a packet of multiple native machine instructions, wherein a first native machine instruction of the packet is executed at the second execution unit, and wherein a second native machine instruction of the packet is executed at a third execution unit that is different from the second execution unit.

46. The method of claim 45, wherein the first native machine instruction and the second native machine instruction are concurrently executed.

47. The method of claim 9, wherein the second instruction is a single instruction, and wherein the single instruction is executed at the second execution unit.

48. The apparatus of claim 15, wherein the second instruction comprises a packet of multiple native machine instructions, wherein a first native machine instruction of the packet is executed at the second execution unit, wherein a second native machine instruction of the packet is executed at a third execution unit that is different from the second execution unit, and wherein the first native machine instruction and the second native machine instruction are concurrently executed.

* * * * *